(12) United States Patent
Chan et al.

(10) Patent No.: US 7,042,466 B1
(45) Date of Patent: May 9, 2006

(54) EFFICIENT CLIP-TESTING IN GRAPHICS ACCELERATION

(75) Inventors: Jeffrey Meng Wah Chan, Mountain View, CA (US); Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 197 days.

(21) Appl. No.: 09/589,039

(22) Filed: Jun. 6, 2000

Related U.S. Application Data

(63) Continuation of application No. 09/204,480, filed on Dec. 3, 1998, now Pat. No. 6,718,457.

(51) Int. Cl.
*G09G 5/30* (2006.01)

(52) U.S. Cl. .................................... 345/620; 345/590
(58) Field of Classification Search ................ 345/418, 345/620, FOR. 215, 558, 621, 561, 559, 345/590, 581, 619
See application file for complete search history.

(56) References Cited

U.S. PATENT DOCUMENTS

| | | | | |
|---|---|---|---|---|
| 5,307,449 A | * | 4/1994 | Kelley et al. ................ | 345/419 |
| 5,345,541 A | * | 9/1994 | Kelley et al. ................ | 345/426 |
| 5,517,603 A | * | 5/1996 | Kelley et al. ................ | 345/426 |
| 5,706,415 A | * | 1/1998 | Kelley et al. ................ | 345/426 |
| 5,712,799 A | | 1/1998 | Farmwald et al. | |
| 5,742,796 A | * | 4/1998 | Huxley ........................ | 345/502 |
| 6,052,128 A | * | 4/2000 | Narayanaswami et al. .. | 345/620 |
| 6,052,129 A | * | 4/2000 | Fowler et al. .............. | 345/620 |
| 6,137,497 A | * | 10/2000 | Strunk et al. ............... | 345/420 |
| 6,603,481 B1 | * | 8/2003 | Kawai et al. ............... | 345/505 |
| 6,671,796 B1 | * | 12/2003 | Sudharsanan et al. ...... | 712/222 |
| 6,714,197 B1 | * | 3/2004 | Thekkath et al. ........... | 345/427 |
| 2001/0042188 A1 | * | 11/2001 | Tremblay et al. ............ | 712/11 |
| 2003/0206173 A1 | * | 11/2003 | Kawai et al. ............... | 345/558 |

* cited by examiner

*Primary Examiner*—Jeffery Brier
*Assistant Examiner*—J. Amini
(74) *Attorney, Agent, or Firm*—Zagorin O'Brien Graham LLP

(57) ABSTRACT

A method and apparatus for performing fast clip-testing operations in a general purpose processor are provided. This is accomplished by executing a single instruction for comparing a first value x to a second value y and, as a result of the comparison, determining whether x is less than y and whether x is less than negative y. The values x and y are stored in respective source registers of the processor specified by the instruction. Finally, as a result of the determination, one or more binary values representing the results of the determination are inserted into a destination register of the processor also specified by the instruction. Accordingly, the invention advantageously provides a general purpose processor with the ability to execute a clip-testing function with a single instruction compared with prior art general purpose processors that require multiple instructions to perform the same function. Thus, the general purpose processor of the present invention allows for more efficient and faster clip-testing operations.

20 Claims, 7 Drawing Sheets

| OPCODE | RD | RS1 | RS2 | RS3 |
|---|---|---|---|---|
| OPCODE | RD | RS1 | RS2 | immediate |
| OPCODE | RD | RS1 | immediate | RS3 |
| OPCODE | RD | RS1 | immediate | immediate |

*FIG. 3A*

| 00011111 | RD | RS1 | RS2 | RS3 |
|---|---|---|---|---|

*FIG. 3B*

EFFICIENT CLIP-TESTING IN GRAPHICS ACCELERATION

This non-provisional application is a continuation of U.S. patent application Ser. No. 09/204,480, filed on Dec. 3, 1998, now U.S. Pat. No. 6,718,457, listing as inventors Marc Tremblay and William Joy, and claims benefit of the earlier filing date thereof.

BACKGROUND OF THE INVENTION

1. Field of the Invention

The present invention relates generally to processors and, more particularly to instructions for use with processors.

2. Related Art

The increasing popularity of multimedia and 3-D graphics display has created a substantial demand for current microprocessors to support graphics operations. Typically, this is done by means of surface graphics techniques, where an object is represented as a collection of very small primitives, simple geometric shapes such as triangles, that approximate the shape of the object. Each of the triangles is represented by a set of vertices whose coordinates are stored in the memory of a computer. In addition to the coordinates of the vertices, additional information pertaining to color, lighting and other properties of the triangles are also stored in the memory of the computer. In order to display the objects represented by the triangles, a series of mathematical transformations are applied to the data stored in the memory of the computer to transform the three-dimensional representation of the object into a two-dimensional image that can be displayed on a screen of the computer. One of the operations required as part of these transformations is a determination of which triangles or portions of the triangles are visible from the viewpoint chosen for the displayed image. This operation is known as clip-testing. An important element of a clip-testing operation is determining whether a point at a given set of coordinates is within the eye space visible on the screen.

While dedicated graphics processors such as DSPs provide varying levels of hardware support for clip-testing operations, general purpose processors typically provide only limited support for clip-testing operations, thereby requiring these operations to be performed by software executing on the processor. Since hardware implementations are inherently faster than software implementations, there is a need for a general purpose processor that supports faster clip-testing operations.

SUMMARY OF THE INVENTION

The present invention provides a method and apparatus for performing fast clip-testing operations in a general purpose processor. The fast clip-testing operations are accomplished by executing a single instruction for comparing a first value x to a second value y and, as a result of the comparison, determining whether x is less than y and whether x is less than negative y. The values x and y are stored in respective source registers of the processor specified by the instruction. As a result of the determination, one or more binary values representing the results of the determination are inserted into a destination register of the processor also specified by the instruction.

Accordingly, the invention advantageously provides a general purpose processor with the ability to execute a clip-testing function with a single instruction compared with prior art general purpose processors that require multiple instructions to perform the same function. Thus, the general purpose processor of the present invention allows for more efficient and faster clip-testing operations.

BRIEF DESCRIPTION OF THE DRAWINGS

FIG. 3A is a diagrammatic block diagram showing instruction formats for four operand instructions supported by the processor of FIG. 1B.

FIG. 3B is a diagrammatic block diagram showing an instruction format for a clip-testing instruction supported by the processor of FIG. 1B.

DETAILED DESCRIPTION OF THE INVENTION

Figure 1A:
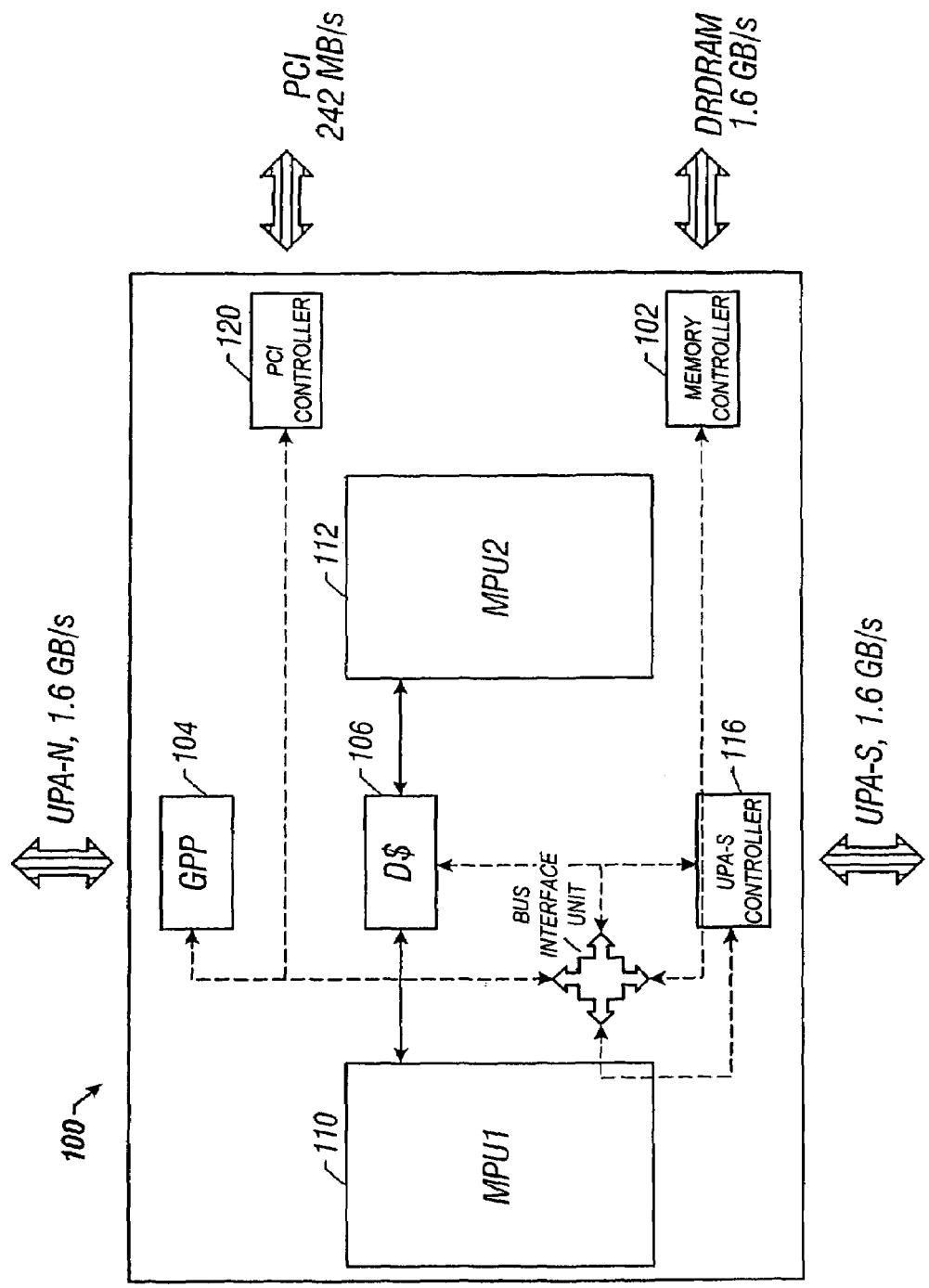
FIG. 1A is a schematic block diagram illustrating a single integrated circuit chip implementation of a processor in accordance with an embodiment of the present invention.
Figure 1B:
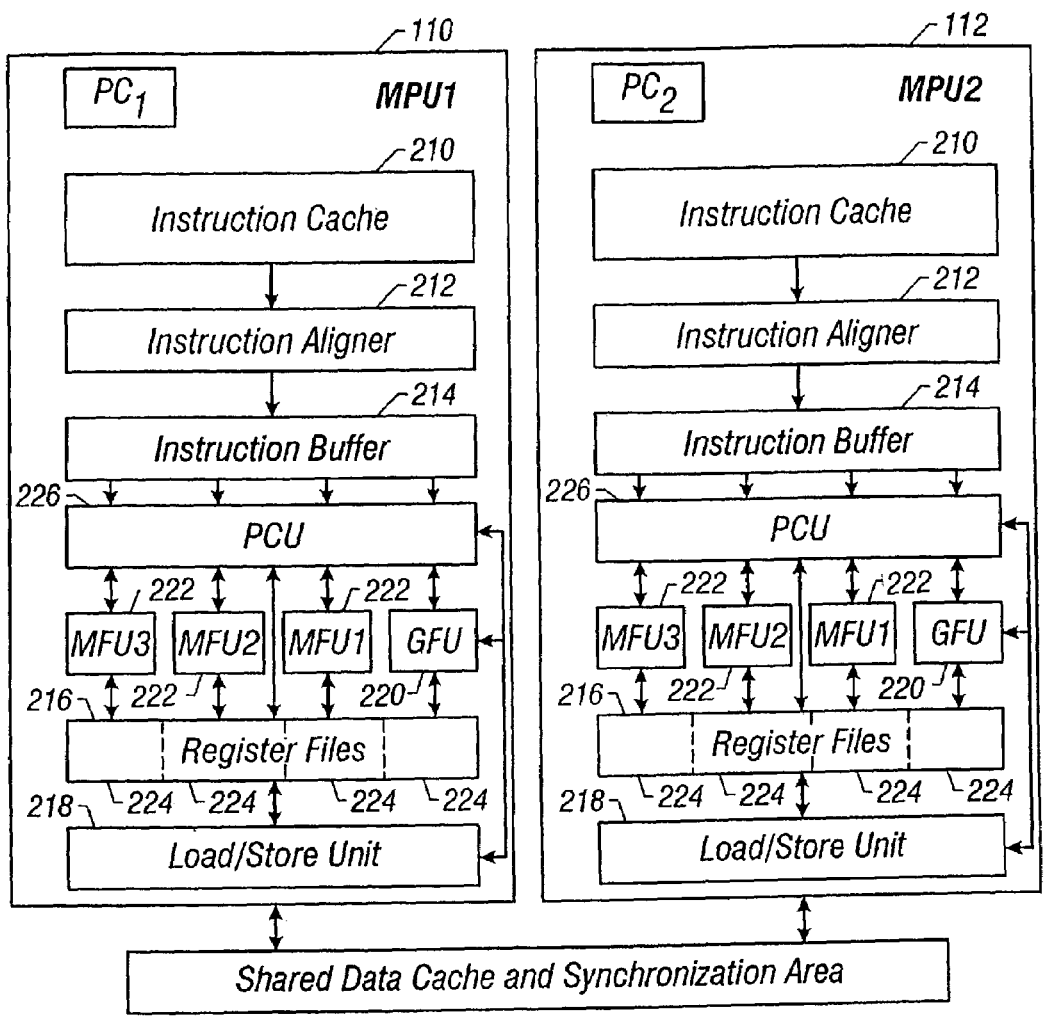
FIG. 1B is a schematic block diagram showing the core of the processor.

A processor in accordance to the principles of the present invention is illustrated in FIGS. 1A and 1B.

Referring to FIG. 1A, a schematic block diagram illustrates a single integrated circuit chip implementation of a processor 100 that includes a memory interface 102, a geometry preprocessor 104, two media processing units 110 and 112, a shared data cache 106 and several interface controllers. The components are mutually linked and closely linked to the processor core with high bandwidth, low-latency communication channels to manage multiple high-bandwidth data streams efficiently and with a low response time.

Illustrative memory interface 102 is a direct Rambus Dynamic RAM (DRDRAM) controller. Shared data cache 106 is a dual-ported storage that is shared among media processing units 110 and 112 with one port allocated to each of media processing unit 110 and 112.

Media processing units 110 and 112 are included in a single integrated circuit chip to support an execution environment exploiting thread level parallelism in which two independent threads can execute simultaneously. The threads may arise from any source such as the same application, different applications, the operating system, or the runtime environment. Parallelism is exploited at the thread level since parallelism is rare beyond four, or even two, instructions per cycle in general purpose code. For example, illustrative processor 100 is an eight-wide machine with eight execution units for executing instructions. A typical "general-purpose" processing code has an instruction level parallelism of about two so that, on average, most (about six) of the eight execution units would be idle at any time. Illustrative processor 100 employs thread level parallelism and operates on two independent threads, possibly attaining twice the performance of a processor having the same resources and clock rate but utilizing traditional non-thread parallelism.

Although processor 100 shown in FIG. 1A includes two processing units on an integrated circuit chip, the architecture is highly scalable so that one to several closely-coupled processors may be formed in a cache-based coherent architecture and resident on the same die to process multiple threads of execution. Thus, in processor 100, a limitation on the number of processors formed on a single die arises from capacity constraints of integrated circuit technology rather than from architectural constraints relating to the interactions and interconnections between processors.

Referring to FIG. 1B, a schematic block diagram shows the core of processor 100. Media processing units 110 and 112 each include an instruction cache 210, an instruction aligner 212, an instruction buffer 214, a split register file 216, a plurality of execution units, and a load/store unit 218. In illustrative processor 100, media processing units 110 and 112 use a plurality of execution units for executing instructions. The execution units for media processing units 110 and 112 include three media functional units (MFU) 222 and one general functional unit (GFU) 220. The media functional units 222 are single-instruction-multiple-data (SIMD) media functional units. Each media functional unit 222 is capable of processing parallel 16-bit components, in addition to 32-bit operands. Various parallel 16-bit operations supply the single-instruction-multiple-data capability for processor 100 including add, multiply-add, shift, compare, and the like. Media functional units 222 operate in combination as tightly-coupled digital signal processors (DSPs). Each media functional unit 222 has a separate and individual sub-instruction stream, but all three media functional units 222 execute synchronously so that the subinstructions progress lock-step through pipeline stages.

General functional unit 220 is a RISC processor capable of executing arithmetic logic unit (ALU) operations, loads and stores, branches, and various specialized and esoteric functions such as parallel power operations, reciprocal squareroot operations, and many others. General functional unit 220 supports less common parallel operations such as the parallel reciprocal square root instruction.

Each media processing unit 110 and 112 includes a split register file 216, which forms a single logical register file including 256 thirty-two bit registers. Split register file 216 is split into a plurality of register file segments 214 to form a multi-ported structure that is replicated to reduce the integrated circuit die area and to reduce access time.

Media processing units 110 and 112 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach. A VLIW instruction word always includes one instruction that executes in general functional unit (GFU) 220 and from zero to three instructions that execute in media functional units (MFU) 222. An MFU instruction field within the VLIW instruction word includes an operation code (opcode) field, two or three source register (or immediate) fields, and one destination register field.

Instructions are executed in-order in processor 100 but loads can finish out-of-order with respect to other instructions and with respect to other loads, allowing loads to be moved up in the instruction stream so that data can be streamed from main memory.

For example, during processing of triangles, multiple vertices are operated upon in parallel so that the utilization rate of resources is high, achieving effective spatial software pipelining. Thus operations are overlapped in time by operating on several vertices simultaneously, rather than overlapping several loop iterations in time. For other types of applications with high instruction level parallelism, high trip count loops are software-pipelined so that most media functional units 222 are fully utilized.

Processor 100 is further described in co-pending application Ser. No. 09/204,480, entitled "A Multiple-Thread Processor for Threaded Software Applications" by Marc Tremblay and William Joy, filed on Dec. 3, 1998, which is herein incorporated by reference in its entirety.

Figure 2A:
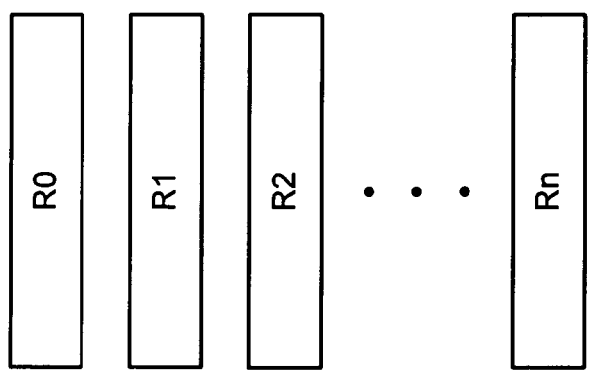
FIG. 2A is a diagrammatic block diagram of a register file of the processor of FIG. 1B.
Figure 2B:
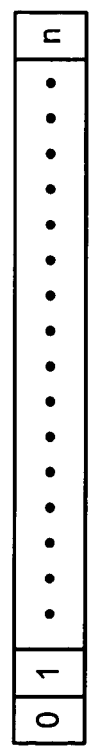
FIG. 2B is a diagrammatic block diagram of a register of the register file of FIG. 2A.

The structure of a register file of the processor of FIG. 1B is illustrated in FIG. 2A. The register file is made up of an arbitrary number of registers R0, R1, R2 . . . Rn. Each of registers R0, R1, R2 . . . Rn, in turn has an arbitrary number of bits, as shown in FIG. 2B. In one embodiment, the number of bits in each of registers R0, R1, R2 . . . Rn is 32. However, those skilled in the art realize that the principles of the present invention can be applied to an arbitrary number of registers each having an arbitrary number of bits. Accordingly, the present invention is not limited to any particular number of registers or bits per register.

FIG. 3A illustrates four instruction formats for four-operand instructions supported by the processor of FIG. 1B. Each instruction format has an 8-bit opcode and four 8-bit operands. The first of the operands is a reference to a destination register (RD) for the instruction. The second operand, in turn, is a reference to a first source register for the instruction (RS1). Finally, the third and fourth operands can be references to a second (RS2) and a third source register (RS3), an immediate value to be used in the instruction or any combination thereof.

Figure 4:
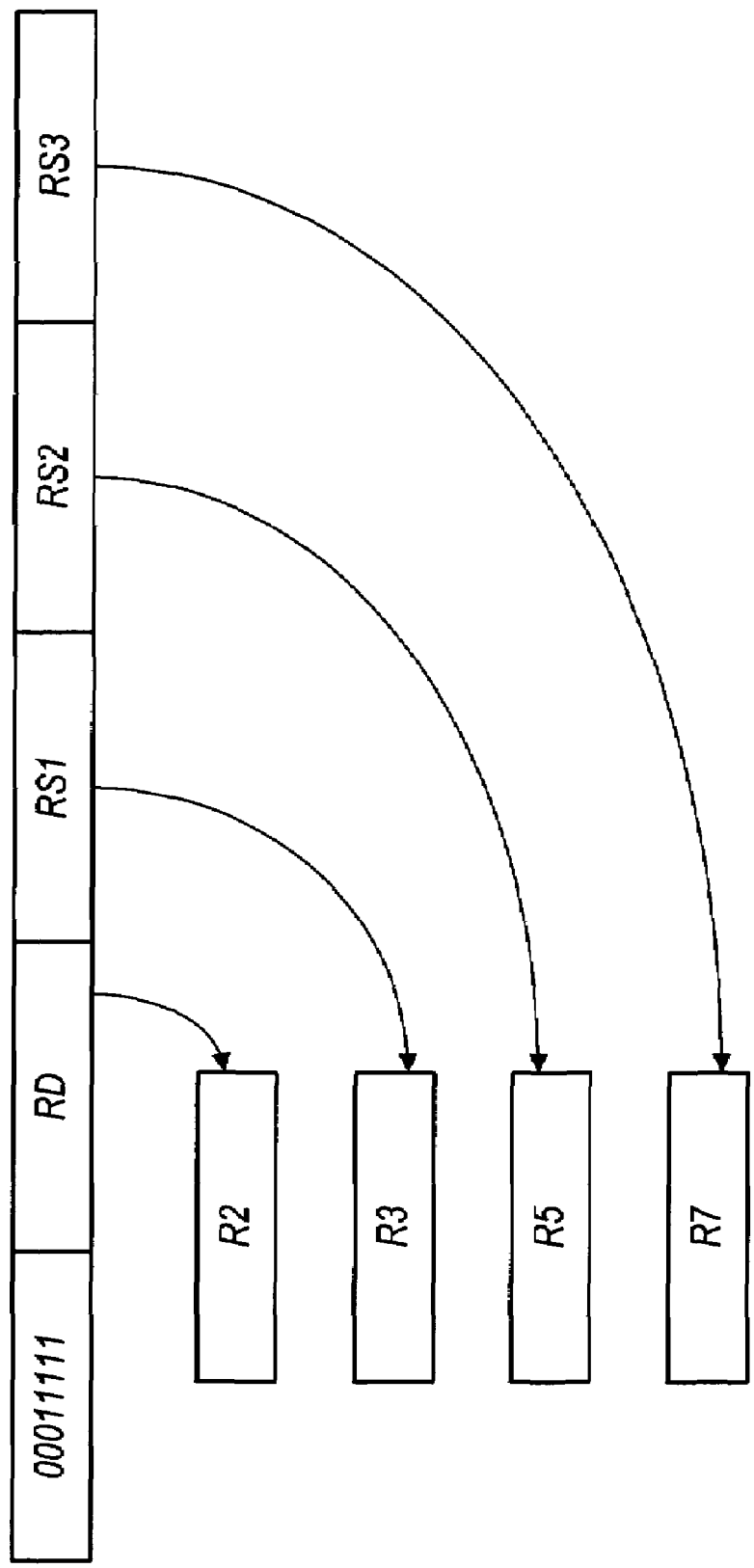
FIG. 4 is a diagrammatic block diagram showing the relationship between the instruction format of FIG. 3B and the register file of FIG. 2A.

FIG. 3B illustrates an instruction format for a clip-testing instruction (clip) supported by the processor of FIG. 1, in accordance to the present invention. All operands are references to registers in the register file of the processor, as shown in FIG. 4. The RD operand represents a clip mask representing whether vertices of a triangle fall outside a range of homogeneous coordinates in the eye space of an image to be clipped. The RS1 operand represents the coefficient defining the homogenous eye space. The RS2 operand represents the x, y and z values of the vertex examined by the clip-testing instruction. The RS3 operand represents the value of the clip mask prior to the execution of the clip-testing instruction.

In FIG. 4, each of the operands of the clip-testing instruction refers to an arbitrary register of the register file of FIG. 2A in which the represented value is stored. For example, the operand RD contains a reference to the R2 register, the operand RS1 contains a reference to the R3 register, the operand RS2 contains a reference to the R5 register and the operand RS3 contains a reference to the R7 register.

Figure 5:
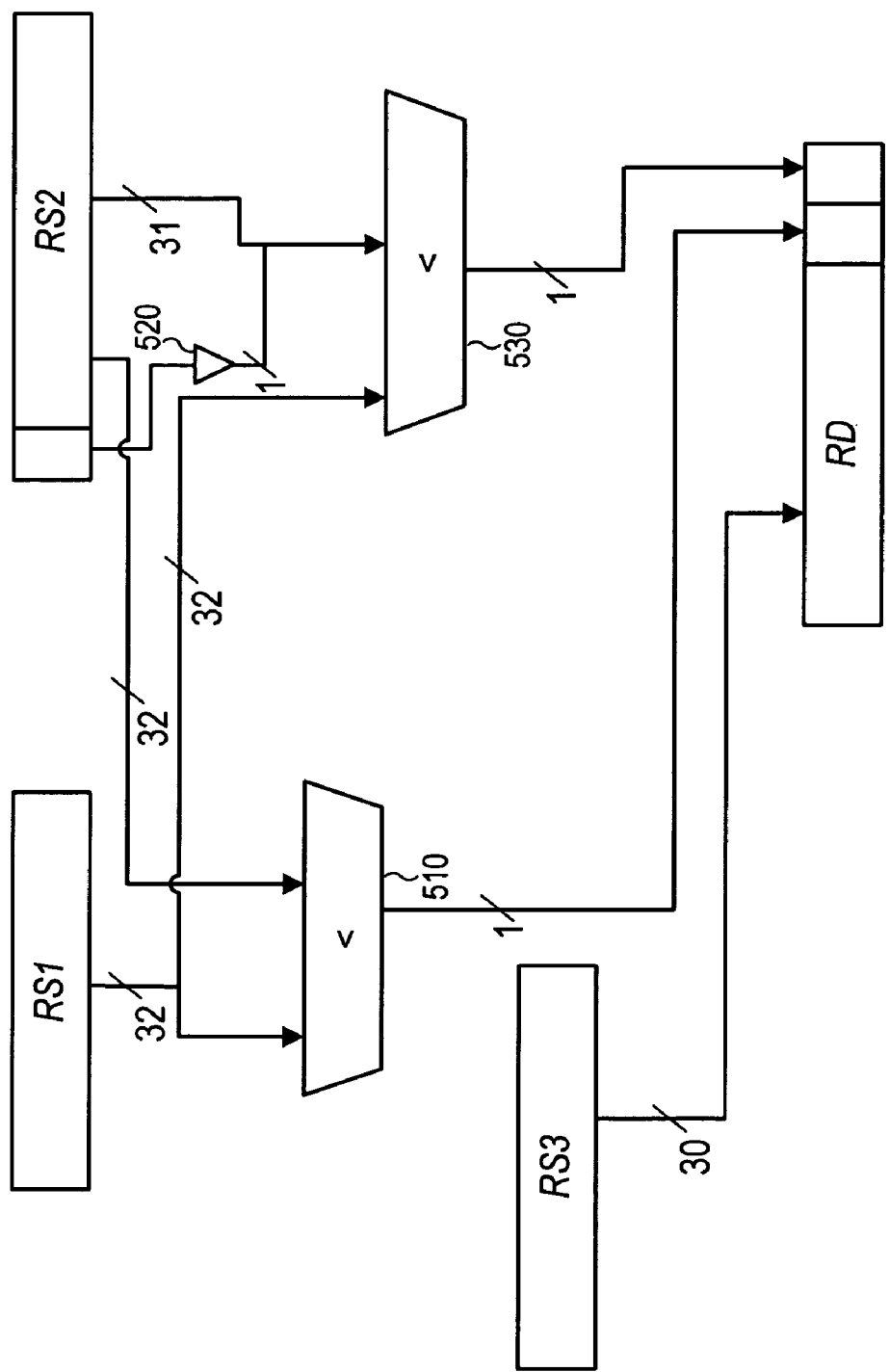
FIG. 5 is a block diagram of one implementation of the circuitry within MFUs 222 of the processor of FIG. 1B for performing the clip-testing instruction of FIG. 3B.

FIG. 5 is a block diagram of one implementation of the circuitry within MFUs 222 of the processor of FIG. 1B for performing the clip-testing operation. The clip-testing operation compares a value stored in register RS1 to the value stored in register RS2 and to the negative of the value stored in RS2. The values in RS1 and RS2 are IEEE single precision floating point values. Additionally, the value stored in register RS3 is shifted left by two bits. The shifted bits are then copied into register RD and two bits representing the results of the comparisons are inserted in the two least significant bits (LSBs) of the value stored in register RD. Thus the value that is stored in register RD represents a bit mask indicating which vertices of a triangle fall outside an homogeneous eye space defined by the coefficient stored in RS1.

In the implementation shown in FIG. 5, when executing the clip-testing instruction, the processor routes the values stored in registers RS1 and RS2 to respective input ports of comparator 510. The value stored in register RS1 is also routed to an input port of comparator 530. The most significant bit (MSB) of the value stored in register RS2 is routed to an input line of inverter 520. A value on an output line of inverter 520, together with the 31 LSBs of the value stored in register RS2, is then routed to the other input port of comparator 530.

More specifically, when the value stored in register RS1 is less than the value stored in register RS2, then a "1" is provided to the second least significant bit of register RD. When the value stored in register RS1 is greater than or equal to the value stored in register RS2, then a "0" is provided to the second least significant bit of register RD. Also, when the value stored in register RS1 is less than the negative of the value stored in register RS2, then a "1" is provided to the least significant bit of register RD. When the value stored in register RS1 is greater than or equal to the negative of the value stored in RS2, then a "0" is provided to the least significant bit of register RD.

The 30 LSBs of the value stored in register RS3 are written into the 30 MSBs of register RD, effectively performing a two bit logical shift left of the value stored in register RS3. The values on respective output ports of comparators 510 and 530 are then written into the 2 LSBs of the register RD. Accordingly, the value that is stored in register RD represents a clip mask indicating whether a vertex of a triangle falls outside an homogenous eye space defined by the value stored in register RS1.

Figure 6:
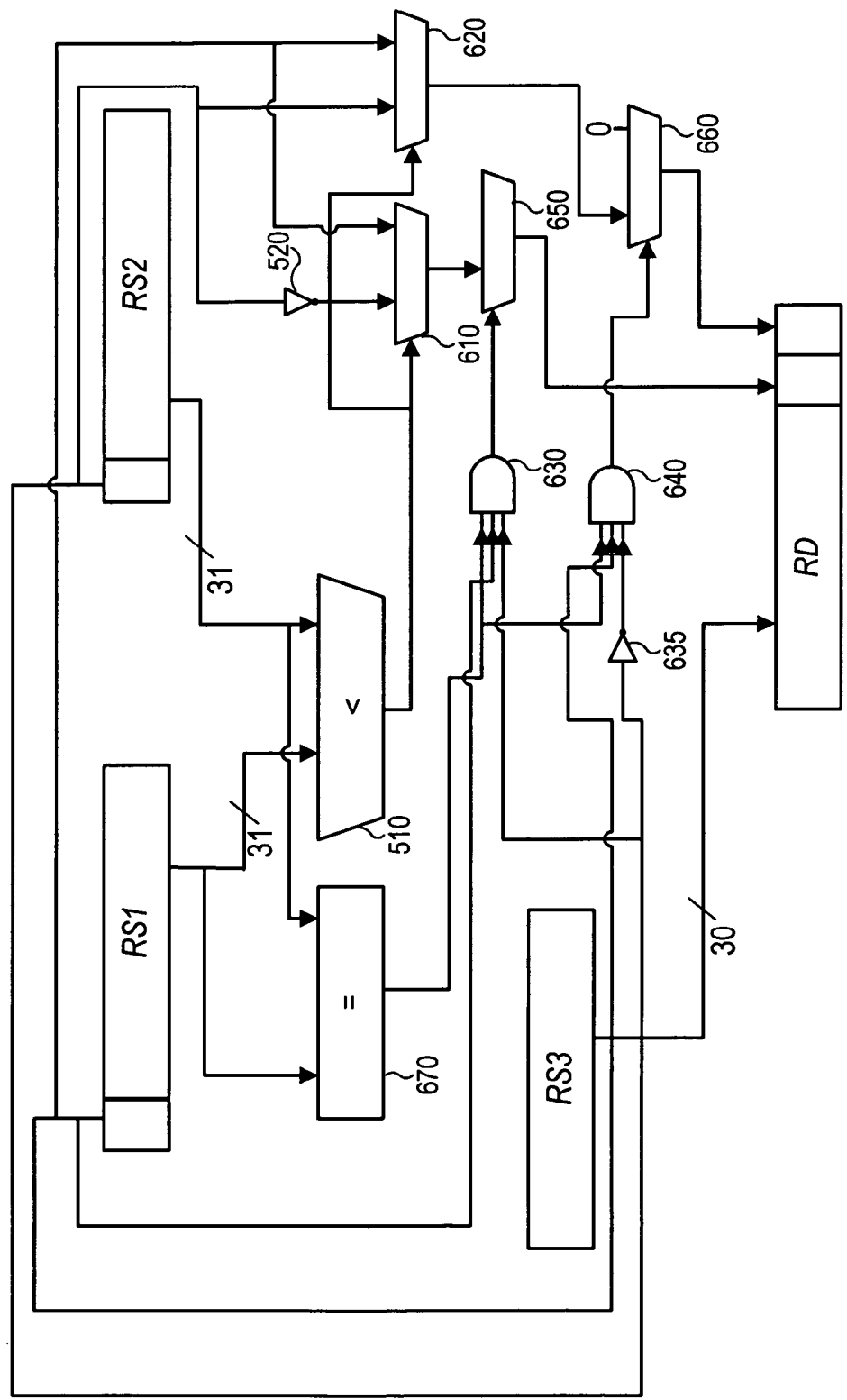
FIG. 6 is a block diagram of an alternative implementation of the circuitry within MFUs 222 of the processor of FIG. 1B for performing the clip-testing instruction of FIG. 3B.

FIG. 6 is a block diagram of an alternative implementation of the circuitry within MFUs 222 of the processor of FIG. 1B for performing the clip-testing instruction. In the implementation of FIG. 6, the absolute values (i.e., the 31 LSBs) of the values stored in registers RS1 and RS2 are routed to respective input ports of comparator 510. A value on an output line of comparator 510 is routed to respective control lines of multiplexers 610 and 620. The sign bits (i.e., the MSBs) of the values stored in registers RS1 and RS2 are routed to respective input lines of multiplexer 620. In addition, the MSB of the value stored in register RS2 is also routed to an input line of inverter 520. An output line of inverter 520 and the MSB of the value stored in register RS1 are, in turn, routed to respective input lines of multiplexer 610.

As a result, the value on the output line of multiplexer 610 effectively represents the value of the comparison rs1<rs2, as illustrated in Table 1 below.

TABLE 1

| Sign RS1 | Sign RS2 | \|rs1\| < \|rs2\| | rs1 < rs2 |
|---|---|---|---|
| 1 | 1 | 1 | 0 |
| 1 | 0 | 1 | 1 |
| 0 | 1 | 1 | 0 |
| 0 | 0 | 1 | 1 |
| 1 | 1 | 0 | 1 |
| 1 | 0 | 0 | 1 |
| 0 | 1 | 0 | 0 |
| 0 | 0 | 0 | 0 |

Similarly, the value on the output line of multiplexer 620 effectively represents the value of the comparison rs1<−rs2, as illustrated in Table 2 below.

TABLE 2

| Sign RS1 | sign RS2 | \|rs1\| < \|rs2\| | rs1 < − rs2 |
|---|---|---|---|
| 1 | 1 | 1 | 1 |
| 1 | 0 | 1 | 0 |
| 0 | 1 | 1 | 1 |
| 0 | 0 | 1 | 0 |
| 1 | 1 | 0 | 1 |
| 1 | 0 | 0 | 1 |
| 0 | 1 | 0 | 0 |
| 0 | 0 | 0 | 0 |

The 30 LSBs of the value stored in register RS3 are written into the 30 MSBs of register RD, effectively performing a two bit logical shift left of the value stored in register RS3. The values on respective output lines of multiplexers 610 and 620 are routed to respective input ports of multiplexers 650 and 660. A logical 0 value is provided on the remaining input ports of multiplexers 650 and 660. Respective control ports of multiplexers 650 and 660 are, in turn, driven by output lines of gates 630 and 640. The values stored in registers RS1 and RS2 are provided to respective input ports of comparator 670. The input lines of gates 630 are connected to the output port of comparator 670 and the sign bits of the values stored in registers RS1 and RS2. The input lines of gates 640 are connected to the output port of comparator 670, the sign bit of the value stored in register RS1 and the complement of the sign bit (generated by inverter 635) of the value stored in register RS2. The output lines of gates 630 and 640 are connected to respective control ports of multiplexers 650 and 660. Finally, the values on respective output ports of multiplexers 650 and 660 are written in the 2 LSBs of register RD.

While a three source register implementation is described, those skilled in the art realize that the principles of the present invention can be applied to instructions having an arbitrary number of source and destination registers. Accordingly, the present invention is not limited to any particular number of source or destination registers.

Embodiments described above illustrate but do not limit the invention. In particular, the invention is not limited by any number of registers specified by the instructions. In addition, the invention is not limited to any particular hardware implementation. Those skilled in the art realize that alternative hardware implementation can be employed in lieu of the one described herein in accordance to the principles of the present invention. Other embodiments and variations are within the scope of the invention, as defined by the following claims.

The invention claimed is:

1. A method of performing clip-testing-on a processor that implements an instruction set, the method comprising:
    providing the processor with a single instruction opcode selected from the instruction set and corresponding operands thereof, together indicating a clip-testing instruction; and
    by executing the single instruction opcode with a first value x and a second value y identified by the operands;
    determining whether x is less than y;
    determining whether x is less than negative y; and
    storing the result of the determinations in a result location.

2. The method of claim 1, wherein the values x and y are stored in respective source registers of the processor specified by the clip-testing instruction.

3. The method of claim 1, further comprising:
    inserting one or more binary values into a destination register of the processor specified by the instruction as a result of the determinations.

4. The method of claim 3, further comprising:
reading a value stored in a third source register of the processor specified by the instruction prior to said inserting;
shifting the value read from the third source register by a predetermined number of bit positions; and
storing the shifted value into the destination register.

5. The method of claim 1, wherein execution of the single instruction opcode by the processor is pipelined.

6. The method of claim 1, wherein the single instruction is executed by the processor with a throughput of one instruction per cycle.

7. The method of claim 1, wherein multiple pairs of the values x and y are provided and results of the determinations of whether x is less than y and whether x is less than negative y are stored in a result location for each pair of the values x and y.

8. A general purpose processor that implements an instruction set comprising:
a register file;
an instruction fetch unit; and
decoding circuitry;
wherein by executing clip-testing instructions including a single instruction opcode selected from the instruction set and corresponding one or more operands thereof:
a first value x is compared to a second value y;
as a result of the comparison, it is determined whether x is less than y and whether x is less than negative y; and
as a result of the determination, one or more binary values are inserted into a destination register of the processor specified by the instruction.

9. The processor of claim 8, wherein the values x and y are stored in respective source registers of the register file specified by the instruction.

10. The processor of claim 8, wherein one or more binary values are stored into a destination register of the register file specified by the instruction as a result of the determination.

11. The processor of claim 10, wherein a value stored in a third source register of the register file specified by the instruction is read prior to said inserting, the value read from the third source register is shifted by a predetermined number of bit positions, and the shifted value is stored into the destination register.

12. The processor of claim 8, wherein execution of the single instruction opcode by the processor is pipelined.

13. The processor of claim 8, wherein the instruction is executed by the processor with a throughput of one instruction per cycle.

14. The processor of claim 8, wherein multiple pairs of the values x and y are compared and results of the determination of whether x is less than y and whether x is less than negative y are stored into a destination register for each pair of the values x and y.

15. An apparatus comprising:
means for receiving a single-instruction opcode selected from a processor instruction set and corresponding one or more operands thereof, together indicating a clip-testing instruction;
means for executing the single instruction opcode, the means for executing including:
means for comparing a first value to a second value, the first and second values identified by the one or more operands;
means for determining, based upon the comparing, whether the first value is less than the second value and whether the first value is less than a negative of the second value; and
means for storing the result of the determining in a result location.

16. The apparatus of claim 15, further comprising:
means for inserting one or more binary values into a destination register specified by the instruction as a result of the determination.

17. The apparatus of claim 16, wherein the means for executing further includes:
means for reading a value stored in a third source register specified by the instruction prior to said inserting;
means for shifting the value read from the third source register by a predetermined number of bit positions; and
means for storing the shifted value into the destination register.

18. A computer program product including at least one single-instruction opcode selected from a processor instruction set, the at least one single-instruction opcode executable to, compare a first value to a second value, the first and second values identified by one or more operands of the at least one single-instruction opcode; determine, based upon the comparison, whether the first value is less than the second value and whether the first value is less than a negative of the second value; and store the result of the determination in a result location.

19. The computer program product of claim 18, wherein the at least one single-instruction opcode is further executable to:
insert one or more binary values into a destination register specified by the instruction as a result of the determination;
read a value stored in a source register specified by the instruction prior to said inserting;
shift the value read from the source register by a predetermined number of bit positions; and
store the shifted value into the destination register.

20. A processor that implements an instruction set comprising:
a plurality of independent parallel execution paths that execute in parallel across a plurality of threads, the execution paths including a multiple instruction parallel pathway for execution of a thread; and
the independent parallel execution paths including a plurality of functional units capable of executing a plurality of instructions in parallel from an instruction set that includes data handling instructions for multiple-thread execution on the plurality of functional units and one or more special purpose registers of a corresponding parallel execution path for fast bypass between different functional units thereof,
wherein the plurality of functional units include,
an instruction fetch unit, and
decoding circuitry,
wherein by executing clip-testing instructions including a single instruction opcode selected from the instruction set and corresponding one or more operands thereof:
a first value x is compared to a second value y;
as a result of the comparison, it is determined whether x is less than y and whether x is less than negative y; and
as a result of the determination, one or more binary values are inserted into a destination register of the processor specified by the instruction.

* * * * *

UNITED STATES PATENT AND TRADEMARK OFFICE
CERTIFICATE OF CORRECTION

PATENT NO. : 7,042,466 B1
APPLICATION NO. : 09/589039
DATED : May 9, 2006
INVENTOR(S) : Jeffrey Meng Wah Chan et al.

It is certified that error appears in the above-identified patent and that said Letters Patent is hereby corrected as shown below:

On the title page item (75) after "Michael F. Deering, Los Altos, CA, US", please add --Marc Tremblay, Menlo Park, CA, US--.

Signed and Sealed this

Twenty-first Day of November, 2006

JON W. DUDAS
*Director of the United States Patent and Trademark Office*